(12) United States Patent
Yoshitani et al.

(10) Patent No.: US 11,521,302 B2
(45) Date of Patent: Dec. 6, 2022

(54) IMAGE PROCESSING APPARATUS AND IMAGE PROCESSING METHOD

(71) Applicant: CANON KABUSHIKI KAISHA, Tokyo (JP)

(72) Inventors: Akihiro Yoshitani, Yokohama (JP); Haruna Yamazaki, Ichikawa (JP); Tomoki Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 266 days.

(21) Appl. No.: 16/917,693

(22) Filed: Jun. 30, 2020

(65) Prior Publication Data
US 2021/0012469 A1  Jan. 14, 2021

(30) Foreign Application Priority Data

Jul. 10, 2019  (JP) .............................. JP2019-128653

(51) Int. Cl.
| | |
|---|---|
| *G06T 1/20* | (2006.01) |
| *G06T 5/00* | (2006.01) |
| *H04N 1/60* | (2006.01) |
| *G03G 15/01* | (2006.01) |
| *G06T 1/60* | (2006.01) |

(52) U.S. Cl.
CPC ................ *G06T 5/005* (2013.01); *G06T 1/20* (2013.01); *G06T 1/60* (2013.01)

(58) Field of Classification Search
CPC .. G06T 1/20; G06T 1/60; G06T 5/005; G09G 5/39; G09G 5/399; H04N 1/405; H04N 1/4058; H04N 1/52; H04N 1/54; H04N 1/56; H04N 1/60; H04N 1/6002; H04N 1/6019; H04N 1/6025; H04N 1/6027; H04N 1/6022; H04N 1/6072; H04N 1/46; G03G 15/0115; G03G 15/0121; G03G 15/04027; G03G 15/0863; G03G 15/326; G03G 15/5029; G06K 15/1881; G06K 15/1888;
(Continued)

(56) References Cited

U.S. PATENT DOCUMENTS

| | | | |
|---|---|---|---|
| 9,456,108 B2 | 9/2016 | Kobayashi | |
| 2002/0140693 A1* | 10/2002 | Nakami | .................. H04N 1/46 345/418 |

(Continued)

FOREIGN PATENT DOCUMENTS

| | | |
|---|---|---|
| JP | 2003-230020 | 8/2003 |
| JP | 4646436 | 3/2011 |

*Primary Examiner* — Wesner Sajous
(74) *Attorney, Agent, or Firm* — Venable LLP

(57) ABSTRACT

An image processing apparatus that operates in a plurality of modes including a first mode for performing high image quality processing of image data and a second mode for performing high-speed processing of image data, performs the following processing. More specifically, the apparatus performs, in accordance with the mode to be operated, the settings of each of an operation to output image data from a first DMAC (Direct Memory Access Controller) to a common bus, an operation to input the image data from the common bus to an image processing unit, an operation of the image processing unit, an operation to output the image data from the image processing unit to the common bus, and an operation to output the image data from the common bus to a second DMAC.

17 Claims, 11 Drawing Sheets

(58) Field of Classification Search
CPC .......... G06K 15/1894; G06K 15/4005; G06K 15/1884
See application file for complete search history.

(56) References Cited

U.S. PATENT DOCUMENTS

| | | | |
|---|---|---|---|
| 2006/0066914 A1* | 3/2006 | Niimi | H04N 1/60 358/448 |
| 2006/0087709 A1* | 4/2006 | Ikegawa | H04N 1/32128 358/540 |
| 2009/0128840 A1* | 5/2009 | Kuwata | H04N 1/00129 358/1.9 |
| 2012/0133992 A1* | 5/2012 | Hirano | H04N 1/6022 358/3.06 |
| 2018/0084128 A1* | 3/2018 | Nakamura | H04N 1/405 |
| 2018/0373180 A1* | 12/2018 | Takemura | H04N 1/4055 |
| 2019/0306370 A1* | 10/2019 | Itoh | H04N 1/4058 |

\* cited by examiner

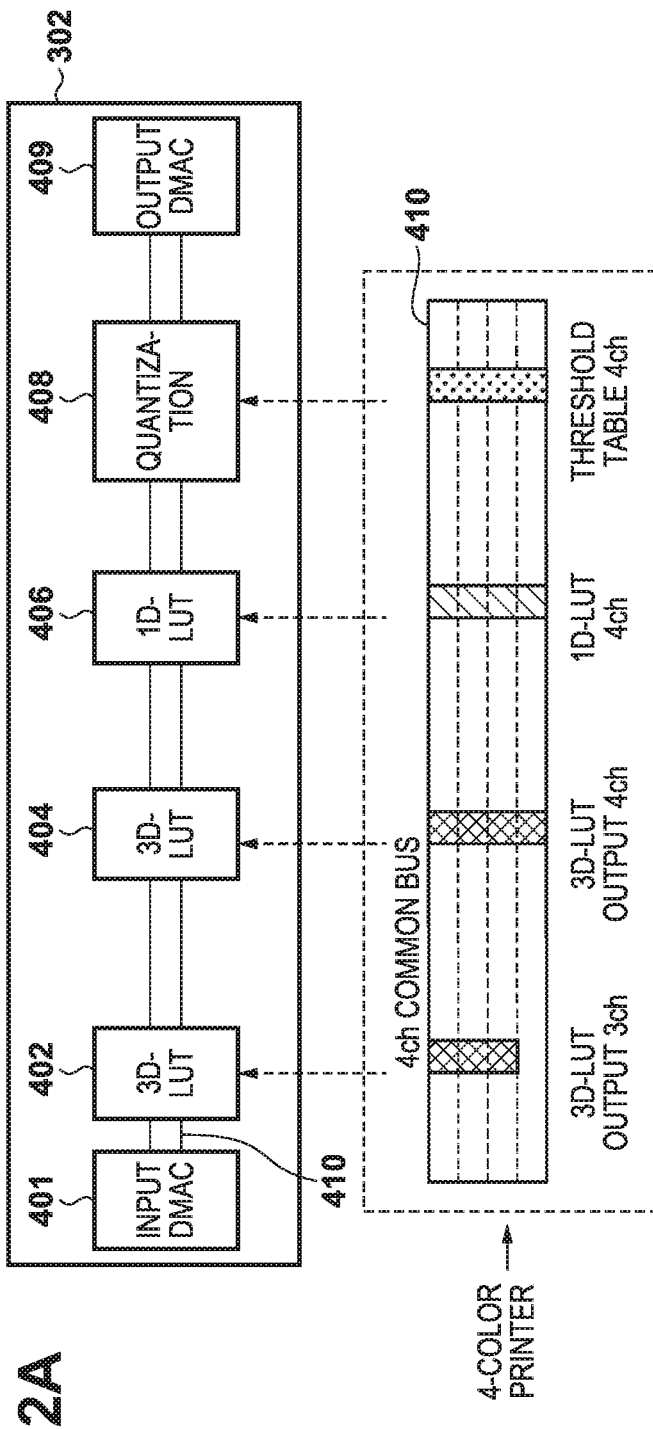
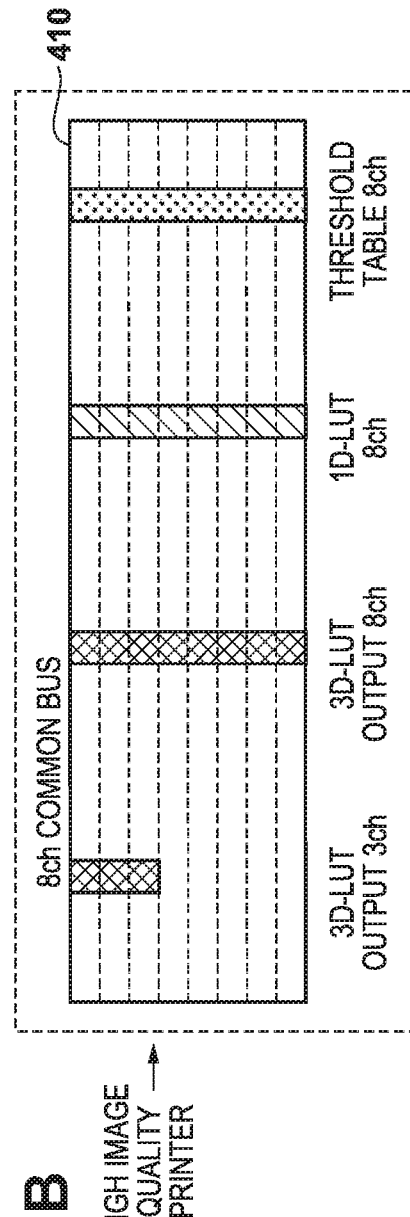

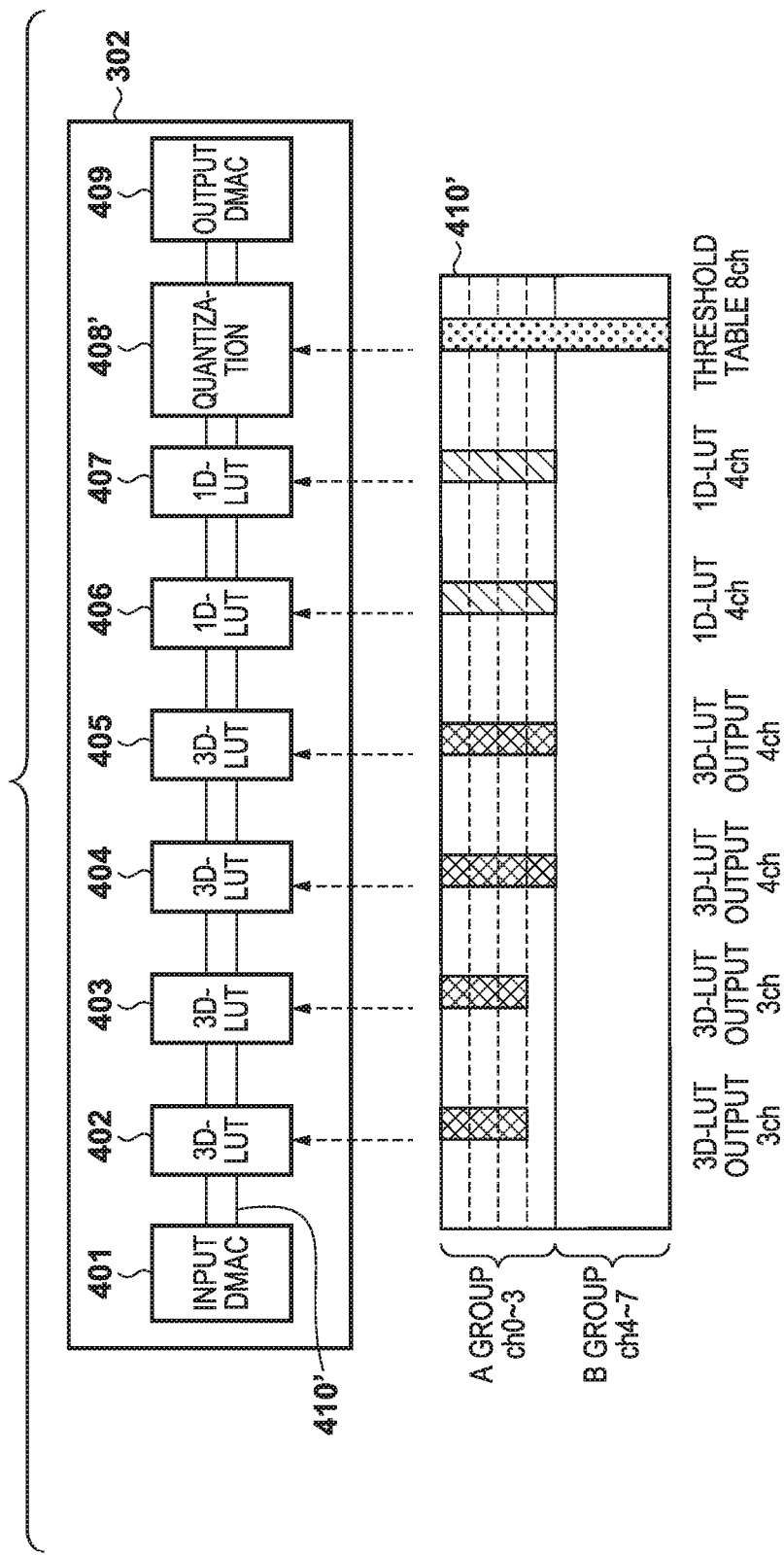

FIG. 5A

| x0-R | x0-G | x0-B | x1-R | x1-G | x1-B | x2-R | x2-G | x2-B | ... |

FIG. 5B

| | x0-R | x1-R | x2-R | x3-R | x4-R | ... |
|---|---|---|---|---|---|---|
| ADDRESS DIFFERENCE | x0-G | x1-G | x2-G | x3-G | x4-G | ... |
| ADDRESS DIFFERENCE | x0-B | x1-B | x2-B | x3-B | x4-B | ... |

FIG. 5C

| x0 | x1 | x2 | x3 | x4 | x5 | x6 | x7 | x8 | ... |

FIG. 5D

| | | | | |
|---|---|---|---|---|
| ch0 | x0-R | x1-R | x2-R | ... |
| ch1 | x0-G | x1-G | x2-G | |
| ch2 | x0-B | x1-B | x2-B | |
| ch3 | 0 | 0 | 0 | |
| ch4 | 0 | 0 | 0 | |
| ch5 | 0 | 0 | 0 | |
| ch6 | 0 | 0 | 0 | |
| ch7 | 0 | 0 | 0 | |

FIG. 5E

| | | | | |
|---|---|---|---|---|
| ch0 | x0-R | x2-R | x4-R | ... |
| ch1 | x0-G | x2-G | x4-G | |
| ch2 | x0-B | x2-B | x4-B | |
| ch3 | 0 | 0 | 0 | |
| ch4 | x1-R | x3-R | x5-R | |
| ch5 | x1-G | x3-G | x5-G | |
| ch6 | x1-B | x3-B | x5-B | |
| ch7 | 0 | 0 | 0 | |

FIG. 5F

| | | | | |
|---|---|---|---|---|
| ch0 | x0 | x1 | x2 | ... |
| ch1 | x0 | x1 | x2 | |
| ch2 | x0 | x1 | x2 | |
| ch3 | 0 | 0 | 0 | |
| ch4 | 0 | 0 | 0 | |
| ch5 | 0 | 0 | 0 | |
| ch6 | 0 | 0 | 0 | |
| ch7 | 0 | 0 | 0 | |

FIG. 5G

| | | | | |
|---|---|---|---|---|
| ch0 | x0 | x8 | x16 | ... |
| ch1 | x1 | x9 | x17 | |
| ch2 | x2 | x10 | x18 | |
| ch3 | x3 | x11 | x19 | |
| ch4 | x4 | x12 | x20 | |
| ch5 | x5 | x13 | x21 | |
| ch6 | x6 | x14 | x22 | |
| ch7 | x7 | x15 | x23 | |

FIG. 5H

| | | | | |
|---|---|---|---|---|
| ch0 | x0 | x2 | x4 | ... |
| ch1 | x0 | x2 | x4 | |
| ch2 | x0 | x2 | x4 | |
| ch3 | 0 | 0 | 0 | |
| ch4 | x1 | x3 | x5 | |
| ch5 | x1 | x3 | x5 | |
| ch6 | x1 | x3 | x5 | |
| ch7 | 0 | 0 | 0 | |

FIG. 6A

|     |      |      |      |     |
|-----|------|------|------|-----|
| ch0 | x0-C | x1-C | x2-C | ... |
| ch1 | x0-M | x1-M | x2-M |     |
| ch2 | x0-Y | x1-Y | x2-Y |     |
| ch3 | x0-K | x1-K | x2-K |     |
| ch4 | x0-c | x1-c | x2-c |     |
| ch5 | x0-m | x1-m | x2-m |     |
| ch6 | x0-y | x1-y | x2-y |     |
| ch7 | x0-Gy | x1-Gy | x2-Gy |   |

FIG. 6B

ADDRESS DIFFERENCE

| x0-C | x1-C | x2-C | x3-C | x4-C | ... |
|------|------|------|------|------|-----|
| x0-M | x1-M | x2-M | x3-M | x4-M | ... |
| x0-Y | x1-Y | x2-Y | x3-Y | x4-Y | ... |
| ⋮ |
| x0-Gy | x1-Gy | x2-Gy | x3-Gy | x4-Gy | ... |

FIG. 6C

|     |      |      |      |     |
|-----|------|------|------|-----|
| ch0 | x0-C | x2-C | x4-C | ... |
| ch1 | x0-M | x2-M | x4-M |     |
| ch2 | x0-Y | x2-Y | x4-Y |     |
| ch3 | x0-K | x2-K | x4-K |     |
| ch4 | x1-C | x3-C | x5-C |     |
| ch5 | x1-M | x3-M | x5-M |     |
| ch6 | x1-Y | x3-Y | x5-Y |     |
| ch7 | x1-K | x3-K | x5-K |     |

FIG. 6D
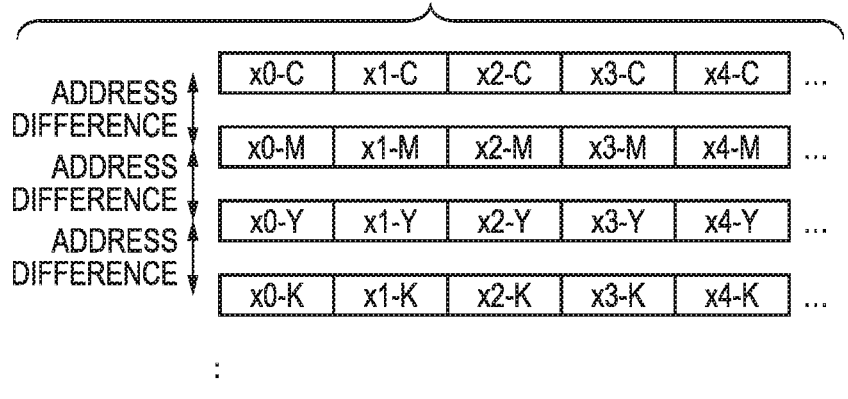
FIG. 6E
| | | | | |
|---|---|---|---|---|
| ch0 | x0-K | x8-K | x16-K | ... |
| ch1 | x1-K | x9-K | x17-K | |
| ch2 | x2-K | x10-K | x18-K | |
| ch3 | x3-K | x11-K | x19-K | |
| ch4 | x4-K | x12-K | x20-K | |
| ch5 | x5-K | x13-K | x21-K | |
| ch6 | x6-K | x14-K | x22-K | |
| ch7 | x7-K | x15-K | x23-K | |
FIG. 6F
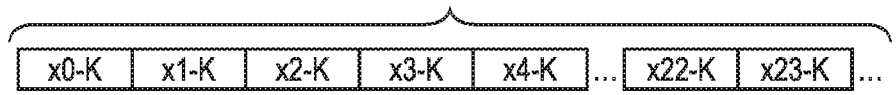

SET TO ch0   SET TO ch1

FIG. 7E

SAME TABLE AS FIG. 7A   ch0~3   ch4~7

IMAGE PROCESSING APPARATUS AND IMAGE PROCESSING METHOD

BACKGROUND OF THE INVENTION

Field of the Invention

The present invention relates to an image processing apparatus and an image processing method, and particularly to, for example, an image processing apparatus and an image processing method capable of supporting both high-speed printing and high image quality printing.

Description of the Related Art

As an apparatus that prints and outputs various kinds of information processed by a computer or the like, an inkjet printing apparatus (to be referred to as a printing apparatus hereinafter) that performs color printing by discharging a plurality of colors of inks from the printhead is popular. Such a printing apparatus may be required to perform higher quality printing. As an apparatus that can satisfy this requirement, there is an apparatus that uses, in addition to a cyan ink and a magenta ink as coloring materials, a so-called light ink which is a lighter density coloring material such as a dye or the like. The apparatus tries to improve the image quality by, for example, reducing the granularity of ink dots of a portion with a comparatively light density such as a highlight portion or the like of a printed image.

On the other hand, depending on the image to be printed, it may be preferable to use a printing apparatus that supports high-speed printing and does not need high image quality printing which requires light ink. For example, in cases such as text printing, draft printing related to test printing, or the like, the printing speed tends to be prioritized as long as a certain degree of image quality can be satisfied. Also, depending on the printing apparatus, an operation to increase the speed of data transfer from a host apparatus and an operation to increase the speed of the printer engine may be supported. In such a case, it is preferable for the processing speeds of image processing operations including color conversion processing to be improved accordingly.

When high image quality printing is to be performed, the output color count increases since the light ink and the like will be included in the output. Thus, color conversion processing corresponding to the output color count will need to be performed, and the circuit scale required for the image processing will increase. On the other hand, when high-speed printing is to be performed as described above, the output color count need only be equal to the four colors of CMYK, but the processing performance of the overall image processing circuit needs to be increased more than a case where high image quality printing is to be performed.

Hence, in a case in which both high-speed printing and high image quality printing is to be supported by the same circuit arrangement, there is a problem that either the overall circuit scale or the overall processing performance needs to be increased compared to a case in which only one of high-speed printing and high image quality printing is to be supported. In other words, if both high-speed printing and high image quality printing are established, the processing performance will be excessive compared to that in a case in which only high image quality printing is to be supported, and a function necessary only for high image quality processing will be excessive compared to that in a case in which only high-speed printing is to be supported.

In this case, the terms "high image quality printing" and "high-speed printing" are used in the following two senses. In one sense, the terms are used to differentiate between modes in the same apparatus in the manner of a "high image quality mode" and a "high-speed mode". In another sense, when the same integrated circuits are incorporated in a high image quality supporting device and a high-speed supporting device to reduce the cost by the effect of mass production, the terms are used to differentiate between the operations performed in the integrated circuits of the respective models.

Japanese Patent Laid-Open No. 2003-230020 discloses that the following arrangement is included in an image processing apparatus that has both a normal image quality mode, in which an output color count is N with respect to an input color count L, and a high image quality mode, in which an output color count is M (M>N) with respect to the input color count L. That is, the image processing apparatus includes a first conversion unit configured to convert, when image data of each of the L colors is to be converted into image data of each of M or N colors (M>N) in accordance with the obtained processing speed information, the image data of each of M or N colors into the M- or N-color image data with a processing time difference corresponding to the difference between M and N and output the converted data. Furthermore, this image processing apparatus also includes a second conversion unit configured to convert the M- or N-color image data converted by the first conversion unit into M-color image data and output the converted data.

According to Japanese Patent Laid-Open No. 2003-230020, since a printing apparatus that outputs 6 colors of CMYKcm (c denotes light cyan and m denotes light magenta) uses the same circuit to perform color conversion by a number of times proportional to the output color count, a six-color output operation requires a color conversion processing time which is 6/4 times more than the color conversion processing time of a four-color output operation. Hence, in the high-speed mode, after CMYK data has been generated once by using color conversion LUT four times on RGB data, c data and m data are generated by using $\gamma$ correction tables from the C data and the M data, respectively, to output a total of six colors. On the other hand, in the high image quality mode, it is arranged so that the six colors of the CMYKcm data can be directly generated from the RGB data by using the color conversion LUT six times.

However, although the color conversion LUT circuit is used a plurality of times in accordance with the output color number in Japanese Patent Laid-Open No. 2003-230020, it is difficult to increase the speed of the overall system by this method. Hence, several apparatuses attempt to increase the speed of the overall color conversion processing operation by performing LUT conversion operations, in parallel, to convert data corresponding to the input color count into data corresponding to the output color count. Hence, the concept disclosed in Japanese Patent Laid-Open No. 2003-230020 cannot be applied to these products. Furthermore, according to the method disclosed in Japanese Patent Laid-Open No. 2003-230020, since only the c data will be generated from the C data and only the m data will be generated from the M data, it is also pointed out in Japanese Patent Laid-Open No. 2003-230020 that the image quality will be degraded compared to a case in which the c data and the m data are generated directly from the RGB data.

As described above, in a case in which both of high-speed printing and high image quality printing are to be supported by using circuits that have the same arrangement, there is a problem in that the processing performance will be excessive compared to a case in which only high image quality printing is to be supported and the function necessary only for high image quality processing will be excessive in a case in which only high-speed printing is to be supported. Hence, a new approach is required in order to solve such a problem.

SUMMARY OF THE INVENTION

Accordingly, the present invention is conceived as a response to the above-described disadvantages of the conventional art.

For example, an image processing apparatus and an image processing method according to this invention are capable of appropriately establishing both high-speed processing and high image quality processing of image data.

According to one aspect of the present invention, there is provided an image processing apparatus that operates in a plurality of modes including a first mode for performing high image quality processing of image data and a second mode for performing high-speed processing of image data, comprising: a memory configured to store image data; a first memory access controller configured to read out the image data from the memory; an image processing unit configured to perform image processing on the image data read out by the first memory access controller; a second memory access controller configured to write, into the memory, the image data that has undergone the image processing by the image processing unit; a common bus configured to connect the first memory access controller, the image processing unit, and the second memory access controller to transfer the image data; and a setting unit configured to set, in accordance with the mode to be operated, settings of each of an operation to output the image data from the first memory access controller to the common bus, an operation to input the image data from the common bus to the image processing unit, an operation of the image processing unit, an operation to output the image data from the image processing unit to the common bus, and an operation to output the image data from the common bus to the second memory access controller.

According to another aspect of the present invention, there is provided an image processing method of an image processing apparatus that operates in a plurality of modes including a first mode for performing high image quality processing of image data and a second mode for performing high-speed processing of image data, and includes a memory configured to store image data, a first memory access controller configured to read out the image data from the memory, an image processing unit configured to perform image processing on the image data read out by the first memory access controller, a second memory access controller configured to write, into the memory, the image data that has undergone the image processing by the image processing unit, and a common bus configured to connect the first memory access controller, the image processing unit, and the second memory access controller to transfer the image data, the method comprising: performing, in accordance with the mode to be operated, settings of each of an operation to output the image data from the first memory access controller to the common bus, an operation to input the image data from the common bus to the image processing unit, an operation of the image processing unit, an operation to output the image data from the image processing unit to the common bus, and an operation to output the image data from the common bus to the second memory access controller.

The invention is particularly advantageous since it is possible to make an operation setting to input and output image data between a first memory access controller, an image processing unit, a common bus, and a second memory access controller in accordance with a first mode for performing high image quality processing of image data and a second mode for performing high-speed processing of image data. As a result, high image quality processing and high-speed processing can be appropriately established even if the same arrangement circuit is used.

Further features of the present invention will become apparent from the following description of exemplary embodiments (with reference to the attached drawings).

BRIEF DESCRIPTION OF THE DRAWINGS

FIGS. 2A and 2B are views showing, as a comparative example, the arrangement of a general print image processing unit incorporated in the image processing apparatus shown in FIG. 1;

FIG. 3 is a block diagram showing the internal arrangement of a print image processing unit according to the first embodiment of the present invention;

FIGS. 5A, 5B, 5C, 5D, 5E, 5F, 5G, and 5H are views showing the operation of an input DMAC at the time of high-speed printing;

FIGS. 6A, 6B, 6C, 6D, 6E, and 6F are views showing the operation of the input DMAC at the time of high image quality printing;

FIGS. 7A, 7B, 7C, 7D, and 7E are views for explaining a threshold table setting of each channel in a quantization processing unit.

DESCRIPTION OF THE EMBODIMENTS

Figure 1:
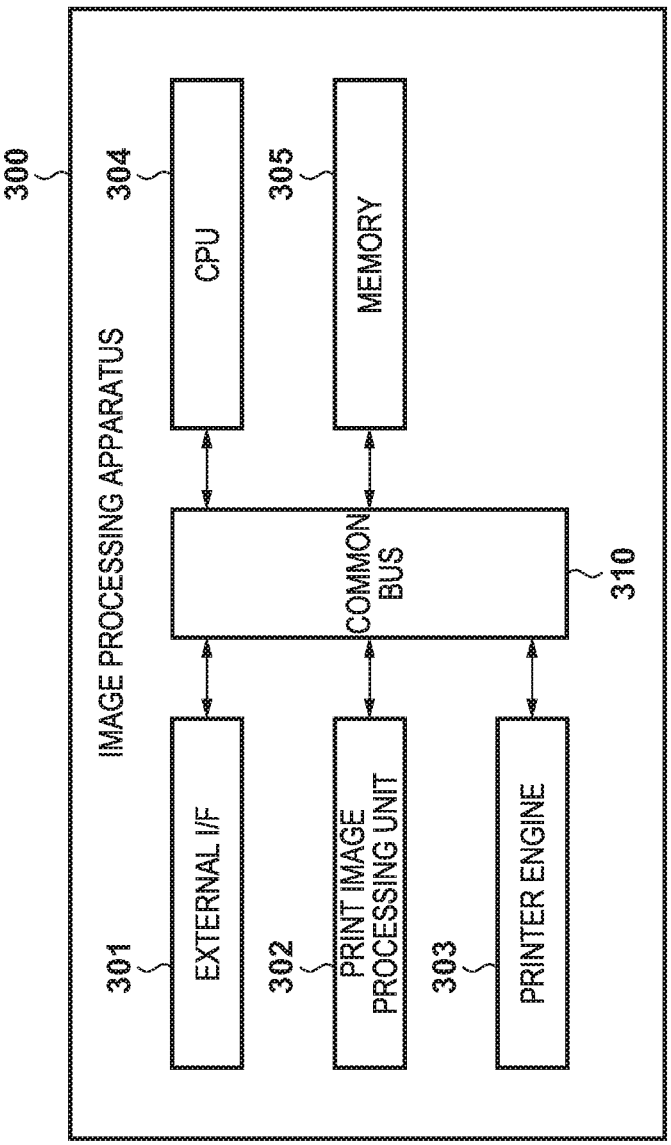
FIG. 1 is a block diagram showing the arrangement of an image processing apparatus according to an exemplary embodiment of the present invention.

Exemplary embodiments of the present invention will now be described in detail in accordance with the accompanying drawings. It should be noted that the following embodiments are not intended to limit the scope of the appended claims. A plurality of features are described in the embodiments. Not all the plurality of features are necessarily essential to the present invention, and the plurality of features may arbitrarily be combined. In addition, the same reference numerals denote the same or similar parts throughout the accompanying drawings, and a repetitive description will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" (to be also referred to as "sheet" hereinafter) not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

FIG. 1 is a block diagram showing the arrangement of an image processing apparatus according to an exemplary embodiment of the present invention. As shown in FIG. 1, a general printer apparatus is a representative embodiment of an image processing apparatus 300.

According to FIG. 1, the image processing apparatus 300 includes an external I/F 301 that supplies image data from the outside, a printer engine 303 that prints an image on a print medium, a CPU 304 that controls the overall apparatus, and a memory 305 that stores data and programs to be executed by the CPU 304. As a specific arrangement, the external I/F 301 can include a wired/wireless LAN, a USB interface, an SD card interface, and the like. As a specific arrangement, the memory 305 can include a volatile memory such as a DRAM, an SRAM, or the like and a non-volatile memory such as an EEPROM, an FeRAM, or the like.

Note that, in the following description, assume that RGB multi-valued image data having a bitmap format is input via the external I/F 301 and stored in the memory 305 regardless of the specific arrangement of the interface. In this embodiment, the printer engine 303 uses a printhead according to an inkjet method to print an image by discharging ink to a print medium.

As a representative example of a printer engine, there is an arrangement that discharges ink to a print medium by scanning, in a predetermined direction (main scanning direction), a carriage mounted with a printhead, and conveying the print medium in a direction (sub-scanning direction) perpendicular to the man scanning direction for each scan. It is also possible to use a printer engine that has an arrangement in which a full-line printhead having a print width corresponding to the width of a print medium is used and a print medium is conveyed in a direction (sub-scanning direction) perpendicular to the direction (main scanning direction) of the print element array of the full-line printhead.

The image processing apparatus 300 further includes a print image processing unit 302 in which the RGB multi-valued image data is input and undergoes a series of processes such as output γ correction and quantization on a band basis to be converted into binary data that can be processed by the printer engine 303. The binary data output from the print image processing unit 302 is output to the printer engine 303. Note that as long as it is arranged so that the printhead of the printer engine 303 performs color printing by discharging four color inks, for example, cyan (C), magenta (M), yellow (Y), and black (K), the RGB image data will be converted into YMCK density image data. Also, since, for example, light cyan (c), light magenta (m), light yellow (y), and gray (Gy) inks are used in addition to CMYK inks in the case of an arrangement that uses an eight-color-ink printhead supporting high image quality processing, the RGB image data will be converted into density image data based on the eight color components.

The respective processing units of the external I/F 301, the print image processing unit 302, the printer engine 303, the CPU 304, and the memory 305 are connected to each other by a common bus 310.

Note that in the example shown in FIG. 1, the image processing apparatus 300 has an arrangement in which the printer engine 303 is integrated. However, it may be arranged so that the printer engine 303 is not incorporated in the image processing apparatus 300 but is arranged externally.

First Embodiment

FIGS. 2A and 2B are views showing, as a comparative example, the arrangement of a general print image processing unit incorporated in an image processing apparatus 300 shown in FIG. 1.

As shown in FIGS. 2A and 2B, a print image processing unit 302 includes, as input/output units, an input DMAC (Direct Memory Access Controller) 401 that reads out image data from a memory 305 via a common bus 310 and an output DMAC (Direct Memory Access Controller) 409 that outputs the quantization result of each output color to the memory 305 via the common bus 310. The print image processing unit 302 further includes 3D-LUTs 402 and 404, each of which uses, as inputs, three types of input values (for example, R, G, and B values of one pixel) and combines and outputs three to eight types of values.

The print image processing unit 302 further includes a 1D-LUT 406 that performs conversion processing by using different 1D-LUT for each of the plurality of input values, and a quantization processing unit 408 that performs quantization by dither processing by using a different threshold table for each of the plurality of input values.

In the print image processing unit 302, the units are connected by a common bus 410 that is formed by one or more color planes and transfers, pixel by pixel, the image data from the input DMAC 401 to the output DMAC 409.

In a case in which the printhead of a printer engine 303 is arranged to discharge four color inks of CMYK and does not support high image quality printing, the specifications of the above-described modules of the print image processing unit 302 are as follows.

In a case in which the common bus 410 has a data channel arrangement of four channels (ch) and each channel (ch) has a data width of 16 bits, the bus width of the common bus 410 is 16×4=64 bits.

The input DMAC 401 loads the RGB image data from the memory 305 and transfers the respective pixel values of the RGB color components per pixel to the 3D-LUT 402 by inputting each pixel value into channels ch0, ch1, and ch2 of the common bus. In this case, a channel ch3 is not used.

The 3D-LUT 402 receives the RGB data from the channels ch0, ch1, and ch2 of the common bus 410, performs conversion processing using the 3D-LUT 402, and inputs the RGB data, which has been obtained as a result, to each of the channels ch0, ch1, and ch2 of the common bus 410 to transfer the obtained RGB data to the 3D-LUT 404 of the next module. In this case, the channel ch3 is not used.

The 3D-LUT 404 receives the RGB data from the channels ch0, ch1, and ch2 of the common bus 410, performs conversion processing using the 3D-LUT 404, and inputs the CMYK data, which has been obtained as a result, to the channels ch0, ch1, ch2, and ch3 of the common bus 410. Subsequently, the obtained CMYK data is transferred to the 1D-LUT 406 of the next module via the common bus 410.

The 1D-LUT 406 receives each color component value of the CMYK data from the channels ch0, ch1, ch2, and ch3 of the common bus 410, performs γ correction processing using the 1D-LUT 406, and inputs the CMYK data, which been obtained as a result, to the channels ch0, ch1, ch2, and ch3 of the common bus 410. Subsequently, the obtained CMYK data is transferred to the quantization processing unit (quantization processing module) 408 of the next module via the common bus 410.

The quantization processing unit 408 receives each color plane value from the common bus 410, executes quantization processing by dither processing using a threshold table corresponding to each color plane, and inputs the result to the common bus 410 to transfer the result to the output DMAC 409 of the next module.

The output DMAC 409 writes the quantized data of each color plane of the common bus 410 into the memory 305.

In this manner, in a case in which the printhead uses four color inks, the specifications of the processing units included in the print image processing unit 302 will be as shown in FIG. 2A.

The 3D-LUT 402 is a 3ch input and a 3ch output;

The 3D-LUT 404 is a 3ch input and a 4ch output;

The 1D-LUT 406 is a 4ch input and a 4ch output; and

The quantization processing unit 408 is a 4ch input, includes threshold tables corresponding to the four channels, and performs quantization processing (dither processing).

Next, in a case in which the printhead of the printer engine 303 supports high image quality printing and is arranged to discharge light cyan (c), light magenta (m), light yellow (y), and gray (Gy) inks in addition to CMYK inks, the specifications of the modules of the print image processing unit 302 are as follows.

In a case in which the common bus 410 has a data channel arrangement of eight channels (ch) and each channel (ch) has a data width of 16 bits, the bus width of the common bus 410 is 16×8=128 bits.

The specifications and the operations of the input DMAC 401 and the 3D-LUT 402 are the same as those of the case using the printhead that discharges four color inks.

The 3D-LUT 404 receives the RGB data of ch0, ch1, and ch2 of the common bus 410, performs conversion processing using the 3D-LUT 404, and inputs each of the C, M, Y, K, c, m, y, and Gy data, which has been obtained as a result, to the channels ch0, ch1, ch2, ch3, ch4, ch5, ch6, and ch7 of the common bus 410. Subsequently, the obtained data is transferred to the 1D-LUT 406 of the next module via the common bus 410.

The 1D-LUT 406 receives the respective component values of the CMYKcmyGy data from the common bus channels ch0 to ch7 and executes γ correction processing using the 1D-LUT 406. The CMYKcmyGy data which has been obtained as a result is input to the channels ch0 to ch7 of the common bus 410 and transferred to the quantization processing unit 408 of the next module.

The quantization processing unit 408 receives each color plane value from the common bus 410, executes quantization processing by dither processing, and inputs the result to the common bus 410 to transfer the result to the output DMAC 409 of the next module.

In this manner, in a case in which the printhead is to used eight color inks, the specifications of the processing units included in the print image processing unit 302 will be as shown in FIG. 2B.

The 3D-LUT 402 is a 3ch input and a 3ch output;

The 3D-LUT 404 is a 3ch input and an 8ch output;

The 1D-LUT 406 is an 8ch input and an 8ch output; and

The quantization processing unit 408 is an 8ch input, includes threshold tables corresponding to the eight channels, and performs quantization processing (dither processing).

In this case, if it is set so that an SRAM included in each module will hold the table data of each of the 3D-LUT 402, the 3D-LUT 404, and the 1D-LUT 406 and the threshold table data of the quantization processing unit 408, the size of the SRAM required for each module will be proportional to the output channel count. When FIG. 2A and FIG. 2B are compared, it can be seen that the print image processing unit 302 corresponding to a high image quality printer will require an internal bus width which is twice that of the same module of a four-color printer, and each of the LUTs 404 and 406 and the quantization processing unit 408 will require an SRAM whose size is twice that of the corresponding modules of the four-color printer.

Hence, in order to support both high-speed printing and high image quality printing by using the same circuit arrangement in a printer with the above-described specifications, the specifications of each module require a circuit scale corresponding to the high image quality printing, and the processing performance per pixel of each module requires to be that corresponding to high-speed printing. In other words, there is a problem that a circuit and an SRAM corresponding to an output color count other than the four colors of CMYK are unnecessary during a high-speed printing (high-speed processing) operation, and that the performance of each module will be excessive in terms of the specifications during a high image quality printing operation. In consideration of this problem, this embodiment will describe a print image processing unit that can execute high-speed processing and high image quality processing by solving this problem by using a different internal module data path in accordance with whether high-speed printing or high image quality printing is to be performed.

FIG. 3 is a block diagram showing the internal arrangement of the print image processing unit 302 according to the first embodiment. In FIG. 3, the same reference numerals denote the same components (modules) as those shown in FIGS. 2A and 2B, and a description thereof will be omitted. As is obvious from comparing FIGS. 3 and 2A, 3D-LUTs 403 and 405 and a 1D-LUT 407 have been added to the module shown in FIG. 2A.

As is obvious from comparing FIGS. 3 and 2A, the modules 401, 402, 404, and 406 shown in FIG. 2A are also included in the print image processing unit 302 shown in FIG. 3. The processing functions of these modules are the same as those shown in FIG. 2A.

A quantization processing unit 408' includes threshold tables, each of a size corresponding to N×N pixels, for eight channels (ch). The quantization processing unit 408' executes binarization processing by using the coordinate values (X, Y) of the threshold table of each channel with respect to an (NI+X)th input of an (NJ+Y)th raster (note that $0 \leq X < N$, $0 \leq Y < N$, and I and J are natural numbers). Assume that the bus width of a common bus 410' is 8ch, ch0 to ch3 which are some of the eight channels are set to be in an A group, and ch4 to ch7 which are the remaining channels of the eight channels are set to be in a B group. As will be specifically described below, the common bus 410' can be divided and used.

FIGS. 4A to 4D are views showing the internal structure of each of the LUT modules 402 to 407 shown in FIG. 3. The LUT modules 402 to 407 are arranged to basically have the same internal structure.

Figure 4A:
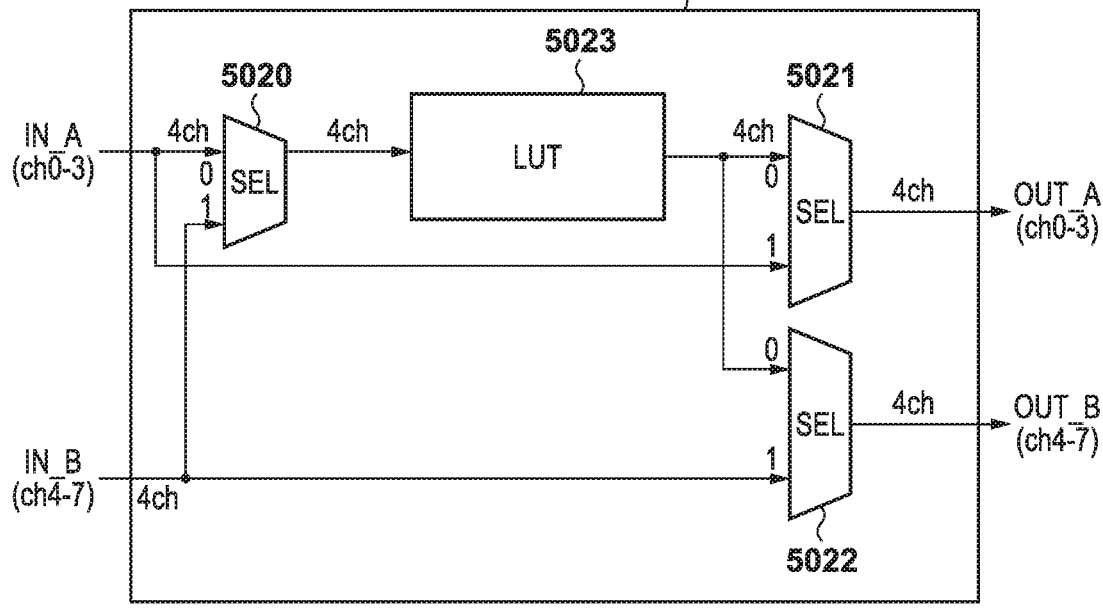
FIGS. 4A, 4B, 4C, and 4D are views showing the internal structure of each LUT module shown in FIG. 3.

As shown in FIG. 4A, each LUT module includes the following three selectors (SEL). That is, the first selector is a selector 5020 that selects one of the four channels from each of the A and B groups of the common bus 410'. The second selector is a selector 5021 that selects one of the A group of the common bus 410' and the output data as a result obtained from performing LUT processing on the input group selected by the selector 5020, and outputs the selected data to the channels of the A group. The third selector is a selector 5022 that selects one of the B group of the common bus 410' and the output data as a result obtained from performing LUT processing on the input group selected by the selector 5020.

Each LUT module further includes an LUT module 5023 that performs a known 1D-LUT processing or 3D-LUT processing upon receiving, as an input, the input group selected on the side of the selector 5020. However, the maximum output channel count of each LUT is four. Assume that each LUT table value is rewritable by a CPU 304 in accordance with the processing contents via a path (not shown).

That is, based on the setting values of the selectors 5020 and 5022, each of the LUT modules 402 to 407 can make outputs, as shown in Table 1 representing the relationship between selector settings and input/output values, to the A and B input groups of the common bus 410'. For example, in a case in which the setting value is "0", each LUT module will select the upper side of the input from each of the selectors (SEL) 5020 to 5022, and in a case in which the setting value is "1", each LUT module will select the lower side of the input from each of the selectors (SEL) 5020 to 5022. The output values from an output OUT_A (the outputs ch0 to ch3 of the common bus 410') and an output OUT_B (the outputs ch4 to ch7 of the common bus 410') of the overall LUT module are shown as output values at the right end of Table 1.

In Table 1, outputs A and B indicate outputs obtained by directly outputting, as through-out, the values of the A and B input groups, outputs [A] and [B] indicate outputs obtained as a result of performing 1D-LUT processing or 3D-LUT processing of the module on the input values of the A and B groups.

TABLE 1

| SEL5020 | SEL5021 | SEL5022 | output |
|---------|---------|---------|--------|
| 0 | 0 | 0 | [A][A] |
| 0 | 0 | 1 | [A]B |
| 0 | 1 | 0 | A[A] |
| 0 | 1 | 1 | AB |
| 1 | 0 | 0 | [B][B] |
| 1 | 0 | 1 | [B]B |
| 1 | 1 | 0 | A[B] |
| 1 | 1 | 1 | AB |

According to Table 1, for example, if the setting value inputs of the selectors 5020 to 5022 are 0, 0, and 1, respectively, the outputs are [A] and B. That is, results obtained from performing LUT processing on values input to the A group (ch0 to ch3) are output from the A group (ch0 to ch3), and values input to the B group (ch4 to ch7) are directly output from the B group (ch4 to ch7). In a similar manner, if the setting value inputs of the selectors 5020 to 5022 are 1, 1, and 0, respectively, the outputs are A and [B]. That is, the values input to the A group are directly output from the A group (ch0 to ch3), and results obtained from performing LUT processing on values input to the B group (ch4 to ch7) are output from the B group (ch4 to ch7).

Figure 4B:
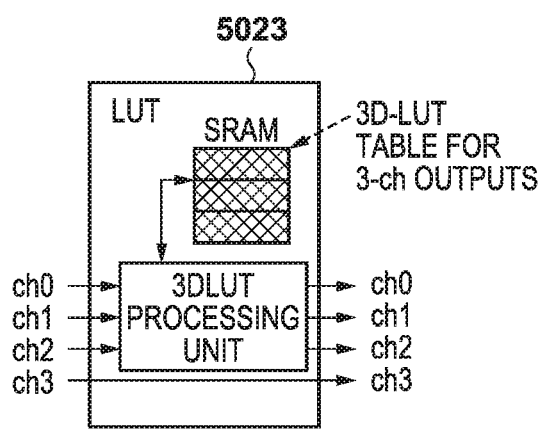

FIG. 4B is a view showing the internal structure of the LUT 5023 included in each of the 3D-LUTs 402 and 403. The LUT 5023 in this case includes an SRAM that stores 3D-LUT tables corresponding to three output channels, executes 3D-LUT processing by using the input channels ch0 to ch2, and outputs the processing results to the output channels ch0 to ch2. Each value input to the input channel ch3 is output to the output channel ch3 as a through-out.

Figure 4C:
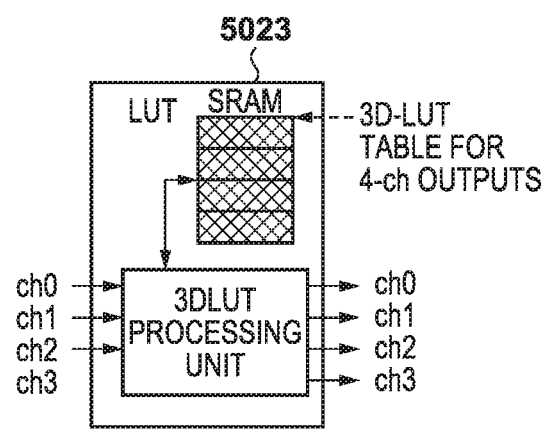

FIG. 4C is a view showing the internal structure of the LUT 5023 included in each of the 3D-LUTs 404 and 405. The LUT 5023 in this case includes an SRAM that stores 3D-LUT tables corresponding to four output channels, executes 3D-LUT processing by using the input channels ch0 to ch2, and outputs the processing results to the output channels ch0 to ch3. The input channel ch3 is ignored.

Figure 4D:
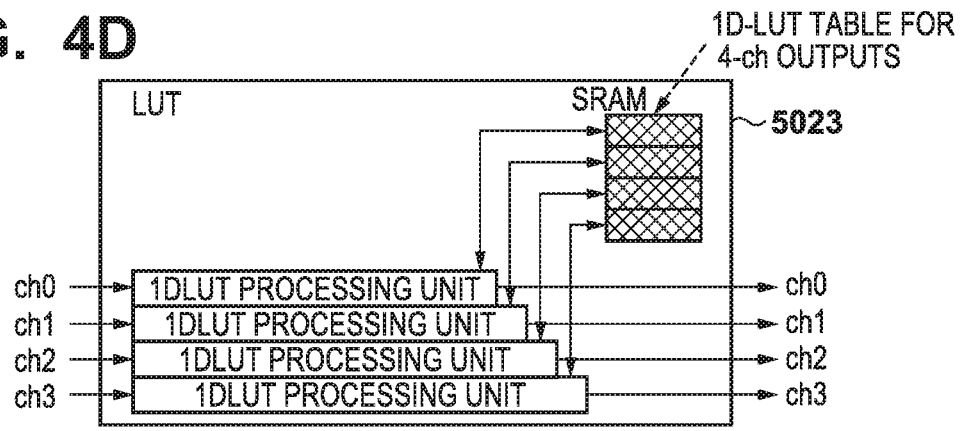

FIG. 4D is a view showing the internal structure of the LUT 5023 included in each of the 1D-LUTs 406 and 407. The LUT 5023 in this case includes an SRAM that stores 1D-LUT tables corresponding to four output channels, executes 1D-LUT processing by using each of the input channels ch0 to ch3, and outputs the processing results to the output channels ch0 to ch3. This is an arrangement that assumes the execution of γ correction processing.

FIGS. 5A to FIG. 5H are views showing the operation of the input DMAC 401.

In color printing, the RGB data of each pixel xi (i=0, 1, 2 . . . ) is arranged in the memory 305 in a format as shown in FIG. 5A or 5B. FIG. 5A shows a case in which the data is arranged in a pixel-sequential format, and FIG. 5B shows a case in which the data is arranged in a line-sequential format. In monochrome printing, the monochrome image data of each pixel xi (i=0, 1, 2 . . . ) is arranged in the memory in a format as shown in FIG. 5C.

In color printing, the input DMAC 401 reads out the color image data arranged in the memory 305 in a format as shown in FIG. 5A or 5B. Then, the input DMAC 401 selects one of the following two processing operations and outputs the obtained result to the common bus 410'. In one processing operation, each of the R, G, and B color component values of the same pixel is output to the channels ch0, ch1, and ch2 of the common bus 410', and a value 0 is output to the channels ch3 to ch7 as shown in FIG. 5D. In the other processing operation, the RGB values of even number pixels (x0, x2, x4 . . . ) are output to the channels ch0, ch1, and ch2, and the RGB values of odd number pixels (x1, x3, x5 . . . ) are output to the channels ch4, ch5, and ch6, and the value 0 is output to the channels ch3 and ch7 as shown in FIG. 5E. As a result, two pixels can be processed concurrently in the subsequent processing module.

In monochrome printing, the input DMAC 401 reads out the monochrome image data arranged in the format as shown in FIG. 5C, selects one of the two following processing operations, and outputs the obtained result to the common bus 410'. In one processing operation, the same gray pixel value of one pixel is output to each of the channels ch0, ch1, and ch2 as shown in FIG. 5F. As a result, the processing operation in the subsequent module can be performed in a similar manner as the color image data. In the other processing operation, the gray pixel values of eight different pixels are output to the channels ch0 to ch7, respectively, as shown in FIG. 5G.

Note that it may be arranged so that the gray pixel values of two different pixels can be input to each of three channels as shown in FIG. 5H. This arrangement will allow the subsequent gray and color processing operations to be integrated without distinguishing these operations.

In a similar manner, the output DMAC 409 also has an arrangement that can receive quantization results corresponding to one or a plurality of pixels from the common bus 410', and output the received results to addresses, which correspond to the respective pixels, of the memory 305.

FIGS. 6A to 6F are views showing the operation of the output DMAC 409.

For example, if the quantization results corresponding to the eight colors output from one pixel are directly received by the channels ch0 to ch7 of the common bus 410' in the state in which the results were output as shown in FIG. 6A, the quantization values of each pixel are line-sequentially written per output color in the memory 305 as the output destination as shown in FIG. 6B. Also, if the quantization results corresponding to the four colors of each of two pixels are directly received by the channels ch0 to ch3 and the channels ch4 to 7 of the common bus 410' in the state in which the results were output as shown in FIG. 6C, the quantization values of each pixel are line-sequentially written per output color in the memory 305 as the output destination as shown in FIG. 6D.

In a similar manner, if the quantization results of the monochrome image data corresponding to eight pixels are directly received by the channels ch0 to ch7 of the common bus 410' in the state in which the results were output as shown in FIG. 6E, data corresponding to eight pixels are written in continuous addresses in the memory 305 as an output destination as shown in FIG. 6F.

The relationship between the selector settings, the processing contents of each module, and the input/output values when the print image processing unit 302 shown in FIG. 3 is set to the high image quality printing mode will be described next with reference to Table 2.

TABLE 2

| Module Name | Processing Contents | Selector Settings | Output of A Group (ch0 to ch3) | Output of B Group (ch4 to ch7) |
|---|---|---|---|---|
| Input DMAC401 | Input one pixel to common bus 410' | — | RGBZr | ZrZrZrZr |
| 3D-LUT 402 | Preprocessing | 001 | R'G'B'Zr | ZrZrZrZr |
| 3D-LUT 403 | No processing | 011 | R'G'B'Zr | ZrZrZrZr |
| 3D-LUT 404 | Post-processing (dark) | 010 | R'G'B'Zr | CMYK |
| 3D-LUT 405 | Post-processing (light) | 001 | cmyGy | CMYK |
| 1D-LUT 406 | Output γ correction (dark) | 110 | cmyGy | C'M'Y'K' |
| 1D-LUT 407 | Output γ correction (light) | 001 | c'm'y'Gy' | C'M'Y'K' |
| Quantization Processing Unit 408' | Quantization of eight colors of one pixel | — | [c'][m'][y'][Gy'] | [C'][M'][Y'][K'] |
| Output DMAC 409 | Output quantization result of one pixel | — | — | — |

The input DMAC 401 reads out, in a raster order, color image data from the memory 305 and inputs, in a raster order, the respective pixel values of the RGB color components per pixel to the channels ch0, ch1, and ch2 of the A input group of the common bus 410' as shown in FIG. 5D. Note that 0 (denoted as Zr in Table 2) is input to the channels ch3 to ch7 of the common bus 410' for the sake of processing convenience.

The 3D-LUT 402 executes conversion processing as preprocessing. Preprocessing values (RGB→R'G'B') are set as the table values of the 3D-LUT 402, and the setting values of the selectors 5020 to 5022 are set as 0, 0, and 1, respectively. As a result, preprocessing is performed by inputting the RGB data to the channels ch0, ch1, and ch2, and the R', G', and B' data are output to the channels ch0, ch1, and ch2 of the common bus 410'. The value 0 input to the channel ch3 is simply output as a through-out. In the channels ch4 to ch7, as a result of selection by the three selectors, the value 0 input to the channels ch4 to ch7 is directly output to the channels ch4 to ch7.

In a similar manner, in the 3D-LUT 403, the setting values of the selectors 5020 to 5022 are set as 0, 1, and 1, respectively, so that through processing is performed on all of the channels. At this time, the LUT table values are ignored.

In the 3D-LUT 404, post-processing of dark ink (CMYK) is performed. Post-processing values (R'G'B'→CMYK) of dark ink are set as the table values of the 3D-LUT, and the setting values of the selectors 5020 to 5022 are set as 0, 1, and 0, respectively. As a result, the R'G'B'Zr values present in the input channels ch0, ch1, ch2, and ch3 are directly output to the output channels ch0, ch1, ch2, and ch3, and the CMYK values of the post-processing result corresponding to the input R'G'B' values are output to the output channels ch4, ch5, ch6, and ch7.

In the 3D-LUT 405, post-processing of light ink (cmyGy) is performed. Post-processing values (R'G'B'→cmyGy) of light ink are set as the table values of the 3D-LUT, and the setting values of the selectors 5020 to 5022 are set as 0, 0, and 1, respectively. As a result, the cmyGy values as the result of post-processing corresponding to the R'G'B' values of the input channels ch0, ch1, and ch2 are output to the output channels ch0, ch1, ch2, and ch3, and the CMYK values input to the input channels ch4, ch5, ch6, and ch7 are directly output to the output channels ch4, ch5, ch6, and ch7.

In the 1D-LUT 406, output γ correction processing of the dark ink is performed. Output γ correction values (C→C', M→M', Y→Y', and K→K') of the dark ink are set as the table values of 1D-LUT, and the setting values of the selectors 5020 to 5022 are set as 1, 1, and 0, respectively. As a result, the C'M'Y'K' values as a result of the output γ correction processing corresponding to the CMYK values of the input channels ch4, ch5, ch6, and ch7 are output to the output channels ch0, ch1, ch2, and ch3, and the cmyGy values input to the input channels ch4, ch5, ch6, and ch7 are directly output to the output channels ch4, ch5, ch6, and ch7.

In the 1D-LUT 407, output γ correction processing of the light ink is performed. Output γ correction values (c→c', m→m', y→y', and Gy→Gy') of the light ink are set as the table values of 1D-LUT, and the setting values of the selectors 5020 to 5022 are set as 0, 0, and 1, respectively. As a result, the c'm'y'Gy' values as a result of the output γ correction processing corresponding to the cmyGy values of the input channels ch4, ch5, ch6, and ch7 are output to the output channels ch0, ch1, ch2, and ch3, and the C'M'Y'K' values input to the input channels ch0, ch1, ch2, and ch3 are directly output to the output channels ch4, ch5, ch6, and ch7.

At this point, a state in which color conversion processing has been performed on all of the colors of the inks to be used and the results of the processing operations have been input to the channels ch0 to ch7 is set.

In the quantization processing unit 408', quantization processing by dither processing is performed on the data to be input to each of the input channels ch0 to ch7, and the quantization results of the input channels are output to the same output channels. Letting [X] be the quantization result of an input value X, results corresponding to the eight colors output from one pixel are output as [c'], [m'], [y'], [Gy'], [C'], [M'], [Y'], and [K'] to the output channels ch0 to ch7, respectively.

In this case, when (NI+X, NJ+Y) are the input image coordinates of the input image, binarization processing is executed by using the (X, Y) coordinate values of the threshold table set in each of the channels as a threshold. Finally, the output DMAC 409 writes the quantization results corresponding to the eight colors of the pixel in the memory 305.

Furthermore, the relationship between the selector settings, the processing contents of each module, and the input/output values when the print image processing unit 302 shown in FIG. 3 is set to the high-speed printing mode will be described with reference to Table 3.

TABLE 3

| Module Name | Processing Contents | Selector Settings | Output of A Group (ch0 to ch3) | Output of B Group (ch4 to ch7) |
|---|---|---|---|---|
| Input DMAC 401 | Input one pixel to common bus 410' | — | RGBZr | ZrZrZrZr |
| 3D-LUT402 | Preprocessing | 001 | R'G'B'Zr | ZrZrZrZr |
| 3D-LUT403 | No processing | 011 | R'G'B'Zr | ZrZrZrZr |
| 3D-LUT404 | Post-processing (dark) | 010 | R'G'B'Zr | CMYK |
| 3D-LUT405 | Post-processing (light) | 001 | cmyGy | CMYK |
| 1D-LUT406 | Output γ correction (dark) | 110 | cmyGy | C'M'Y'K' |
| 1D-LUT407 | Output γ correction (light) | 001 | c'm'y'Gy' | C'M'Y'K' |
| Quantization processing unit 408' | Quantization of eight colors of one pixel | — | [c'][m'][y'][Gy'] | [C'][M'][Y'][K'] |
| Output DMAC 409 | Output quantization result of one pixel | — | — | — |

The input DMAC 401 reads out, as shown in FIG. 5E, the image data from the memory 305 by reading out two pixels at once in a raster order, and inputs, as the RGB pixel values corresponding to the two pixels to the channels ch0, ch1, and ch2 of the A input group and the channels ch4, ch5, and ch6 of the B input group of the common bus 410'. That is, a pixel X0 with coordinates (NI+2X, NJ+Y) and a pixel Y0 with coordinates (NI+2X+1, NJ+Y) are read out from the memory 305, and the RGB values of these pixels are input to each channel as R0, G0, B0 and R1, G1, and B1. Note that the value 0 (denoted as Zr in Table 3) is input to the channels ch3 and ch7 for the sake of processing convenience.

The processing contents and the setting values of the selectors of each LUT module are as shown in Table 3.

In the 3D-LUT 402, the preprocessing of the pixel X0 is performed. Preprocessing values (RGB→R'G'B') are set as the table values of the 3D-LUT, and the setting values of the selectors 5020 to 5022 are set as 0, 0, and 1, respectively.

In the 3D-LUT 403, the preprocessing of a pixel X1 is performed. Preprocessing values (RGB→R'G'B') are set as the table values of the 3D-LUT, and the setting values of the selectors 5020 to 5022 are set as 1, 1, and 0, respectively.

In the 3D-LUT 404, the post-processing of the pixel X0 is performed. Post-processing values (R'G'B'→CMYK) are set as the table values of the 3D-LUT, and the setting values of the selectors 5020 to 5022 are set as 0, 0, and 1, respectively.

In the 3D-LUT 405, the post-processing of the pixel X1 is performed. Post-processing values (R'G'B'→CMYK) are set as the table values of the 3D-LUT, and the setting values of the selectors 5020 to 5022 are set as 1, 1, and 0, respectively.

In the 1D-LUT 406, the output γ correction processing of the pixel X0 is performed. Output γ correction processing values (C→C', M→M', Y→Y', and K→K') are set as the table values of 1D-LUT, and the setting values of the selectors 5020 to 5022 are set as 0, 0, and 1, respectively.

In the 1D-LUT 407, the output γ correction processing of the pixel X1 is performed. Output γ correction processing values (C→C', M→M', Y→Y', and K→K') are set as the table values of 1D-LUT, and the setting values of the selectors 5020 to 5022 are set as 1, 1, and 0, respectively.

As a result of the processing operations performed up to this point, the respective outputs from the modules 401 to 407 become as shown in Table 3, and a state in which all of the color conversion processing operations have been performed on the input values of the two pixels and the results obtained from the color conversion processing operations have been input to the channels ch0 to ch7 is set.

Next, in the quantization processing unit 408', quantization processing by dither processing is performed on each of the pixel X0 of the input channels ch0 to ch3 and the pixel X1 of the input channels ch4 to ch7. As a result, the quantization results of the CMYK color components for each of the two pixels are output. However, the pixel with coordinates (NI+2X, NJ+Y) and the pixel with coordinates (NI+2X+1, NJ+Y) will be concurrently input to the quantization processing unit 408' at the Xth position in the (NJ+Y)th raster. Hence, the threshold table setting of each channel needs to be devised accordingly.

FIGS. 7A to 7E are views for explaining the threshold table settings of the respective channels in the quantization processing unit.

For example, the threshold table to be applied to the coordinates (NI+X, NJ+Y) of the input image is as shown in FIG. 7A when N=8, a threshold table in which the X-coordinate values that are even numbers in FIG. 7A are extracted and set for the channels ch0 to ch3 as shown in FIG. 7B in this embodiment. In a similar manner, a threshold table in which the X-coordinate values that are odd numbers are extracted and set for the channels ch4 to ch7 as shown in FIG. 7C. By setting the threshold tables in this manner, the quantization processing operations of two pixels that have different coordinates can be executed concurrently without changing the circuit arrangement of the quantization processing unit 408'. As a result, the quantization result of the pixel X0 is output to the output channels ch0 to ch3 and the quantization result of the pixel X1 is output to the output channels ch4 to ch7 of the quantization processing unit 408'.

The output DMAC 409 writes the quantization results corresponding to four colors×two pixels continuously in the memory 305 as shown in FIG. 6C.

Hence, according to the above-described embodiment, the operations of the input DMAC and the output DMAC of the print image processing unit, the selector settings of the respective LUTs, the threshold table data or the threshold access address in the quantization processing unit are switched in accordance with whether the processing is for high image quality printing or high-speed printing. As a result, the processing of one pixel of each color during a high image quality printing operation mode using eight color inks and the processing of two pixels of each color during a high-speed printing operation mode using four color inks can be performed by using the same circuit and the same amount of time.

Therefore, since the processing performance per pixel during high-speed printing will be twice that during high image quality printing, the processing performance per pixel in high image quality printing need not be increased in the manner of the related art so that high-speed printing can be supported. This will allow high-speed printing and high image quality printing to be implemented by using the same circuit. As a result, high performance and a reasonable cost can be implemented concurrently.

Second Embodiment

An example in which only brightness to density conversion (including output γ correction) and quantization processing by a 1D-LUT are used as the print image processing in a case in which each pixel (a brightness value Y→a density value K) of a monochrome image, instead of a color image, is to be processed by a print image processing unit will be described here.

In this embodiment, an input DMAC 401 reads out pixel values corresponding to eight pixels of the gray pixel values which are arranged continuously in the main scanning direction in a memory 305 as shown in FIG. 5C, and outputs the pixel values to channels ch0 to ch7 of a common bus 410' as shown in FIG. 5G. In this case, the processing by 3D-LUTs 402 to 405 are ignored.

Subsequently, the brightness to density conversion processing corresponding to four pixels for the channels ch0 to ch3 is executed by a 1D-LUT 406 and the brightness to density conversion processing corresponding to four pixels for the channels ch4 to ch7 is executed by a 1D-LUT 407. Furthermore, a quantization processing unit 408' executes quantization processing of each channel, and as a result, an output DMAC 409 writes the quantization results corresponding to the eight pixels to be held in the channels ch0 to ch7 of the common bus 410' in the memory 305. The processing operations corresponding to eight pixels can be performed concurrently in this manner. That is, when monochrome pixels are to be processed and output, the same arrangement can be used to achieve a processing performance which is eight times that when high image quality printing is performed and is four times that when high-speed printing is performed in accordance with the first embodiment.

However, in the quantization processing unit 408' a threshold table corresponding to the pixel position of each of the eight pixels in the main scanning direction needs to be set for each channel in a manner similar to when high-speed printing is performed according to the first embodiment. That is, as shown in FIGS. 7D and 7E, threshold table values corresponding to the coordinates (NI+8X+K, NJ+Y) (0≤K<8) of the input image need to be set in the threshold table of a channel chK.

Note that Japanese Patent No. 4646436 discloses that, in a manner similar to this embodiment, a data bus is set to transfer a plurality of color components (n colors) per pixel in parallel when color printing is performed and to transfer the gray values of a plurality of pixels (maximum n pixels) concurrently when monochrome printing is performed. Japanese Patent No. 4646436 discloses a method of increasing the transfer performance of the data bus more when monochrome processing is performed than when color processing is performed. However, since the objective of Japanese Patent No. 4646436 is to improve the performance of a real drawing unit in a rendering system when pixel data is transferred, it does not contribute much to increasing the speed of the overall rendering processing because the drawing processing of the drawing unit needs to be performed sequentially each time data per pixel is received via the data bus.

In contrast, in this embodiment, the brightness to density conversion unit and the dither quantization processing unit that can process each color component during color printing can be simply used to perform the brightness to density conversion and the dither quantization processing of a plurality of pixels in parallel at a high-speed during monochrome printing. Therefore, it will be possible to increase the speed of the operation of the overall print image processing unit much more when monochrome printing is to be performed than when color printing is to be performed.

Third Embodiment

A case in which resolution conversion of image data is performed in a multi-value state in a previous stage of a quantization processing unit 408' to perform quantization processing when an output resolution in the main scanning direction or the sub-scanning direction of a print image processing unit 302 is twice the input resolution at the time of high-speed printing will be described.

FIGS. 8A to 8E are views showing the operation of an input DMAC, an output DMAC, and a memory.

Figures 8A, 8B, 8C:
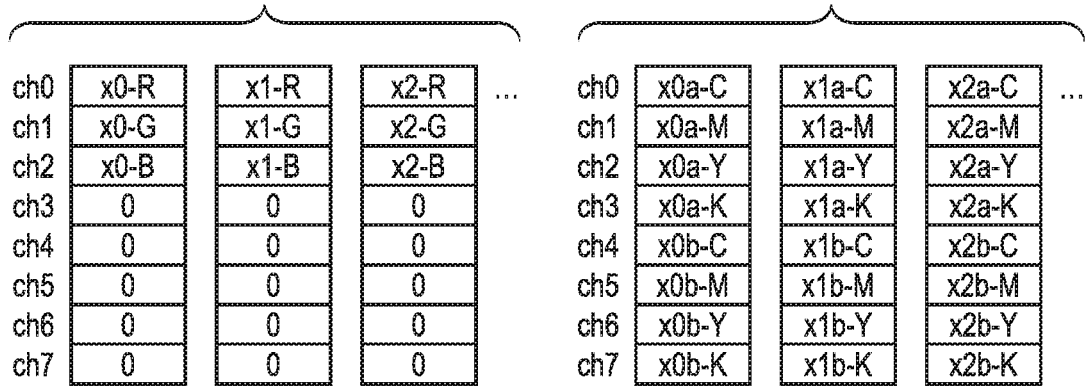
FIGS. 8A, 8B, 8C, 8D, and 8E are views showing the operation of an input DMAC, an output DMAC, and a memory according to the third embodiment of the present invention.

An input DMAC 401 outputs, in a manner similar to the first embodiment, pixel values corresponding to one pixel which are pixel-sequentially arranged in a memory 305 as shown in FIG. 8A to a common bus 410' as shown in FIG. 8B. Furthermore, the setting values of selectors 5020 to 5022 of a 3D-LUT 403 are set to 0, 0, and 0, respectively, so that values that will be ignored as inputs are set in the LUT table.

As a result, the 3D-LUT 403 outputs the input values of input channels ch0 to ch2 to output channels ch0 to ch2 and output channels ch4 to ch6, respectively. A value 0 is input to channels ch3 and ch7. This processing corresponds to processing in which the input of the same one pixel is enlarged into two pixels which are formed by a pixel output from the channels ch0 to ch2 and a pixel output from the channels ch4 to ch6, in a multivalued state. The relationship between the selector settings, the processing contents of each module, and the input/output values at this time is shown in Table 4.

TABLE 4

| Module Name | Processing Contents | Selector Settings | Output of A Group (ch0 to ch3) | Output of B Group (ch4 to ch7) |
|---|---|---|---|---|
| Input DMAC 401 | Input one pixel to common bus 410' | — | R0G0B0Zr | ZrZrZrZr |
| 3D-LUT402 | Preprocessing | 001 | R0'G0'B0'Zr | ZrZrZrZr |
| 3D-LUT403 | Copy A input group to B output group | 000 | R0'G0'B0'Zr | R0'G0'B0'Zr |
| 3D-LUT404 | Post-processing | 001 | C0M0Y0K0 | R0'G0'B0'Zr |
| 3D-LUT405 | Post-processing | 110 | C0M0Y0K0 | C0M0Y0K0 |
| 1D-LUT406 | Output γ correction | 001 | C0'M0'Y0'K0' | C0M0Y0K0 |
| 1D-LUT407 | Output γ correction | 110 | C0'M0'Y0'K0' | C0'M0'Y0'K0' |
| Quantization processing unit 408' | Quantization of four colors × two pixels | — | [C0'][M0'][Y0'][K0'] (odd) | [C0'][M0'][Y0'][K0'] (even) |
| Output DMAC 409 | Output quantization result of two pixels | — | — | — |

As a result, as shown in FIG. 8C, an output DMAC 409 receives the quantization results (xia-C/M/Y/K and xib-C/M/Y/K) of the output channels of two pixels xia and xib obtained as a result of enlarging the same one pixel xi (i=0, 1, 2 . . . ) twice. More specifically, the output DMAC 409 receives the result data in a state in which the quantization results (xia-C/M/Y/K and xib-C/M/Y/K) have been input to the channels ch0 to ch3 and the channels ch4 to ch7.

Figures 8D, 8E:
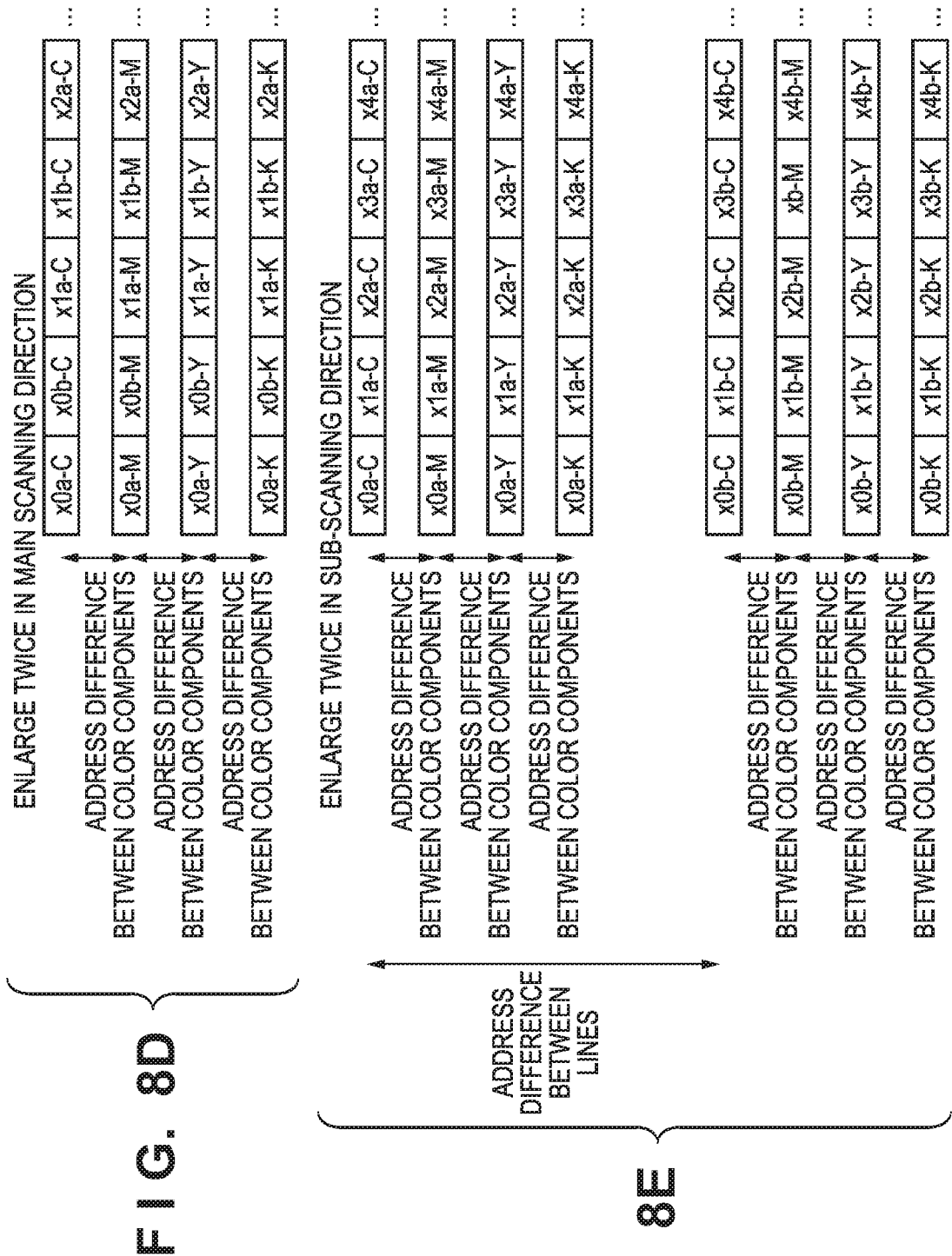

In a case in which the input data is to be enlarged twice in the main scanning direction, the output DMAC 409 will continuously output, as shown in FIG. 8D, the quantization results of the pixels xia and xib for each color component to an address which differs for each color component in the memory 305. In addition in a case in which the input data is to be enlarged twice in the sub-scanning direction, the output DMAC 409 will continuously output, as shown in FIG. 8E, the quantization results of the respective color components for the pixel xia (i=0, 1, 2 . . . ) and the pixel xib (i=0, 1, 2 . . . ) for each color component, to corresponding addresses which are apart from each other by one line in the memory 305.

Therefore, according to the above-described embodiment, the output DMAC can operate in the above-described manner to obtain a quantization result image obtained by enlarging the input image data twice in the main scanning direction or the sub-scanning direction.

In addition, the present invention can be applied to not only a single-function inkjet printing apparatus, but also to a facsimile apparatus using an inkjet printing apparatus as a printing unit, a copy machine, a word processor, or a multi-function peripheral.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-128653, filed Jul. 10, 2019, which is hereby incorporated by reference herein in its entirety.

What is claimed is:

1. An image processing apparatus that operates in a plurality of modes including a first mode for performing high image quality processing of image data and a second mode for performing high-speed processing of image data, comprising:
a memory configured to store image data;
a first memory access controller configured to read out the image data from the memory;
an image processing unit configured to perform image processing on the image data read out by the first memory access controller;
a second memory access controller configured to write, into the memory, the image data that has undergone the image processing by the image processing unit;
a common bus configured to connect the first memory access controller, the image processing unit, and the second memory access controller to transfer the image data; and
a setting unit configured to set a setting for each of a plurality of operations performed by the image processing apparatus, in accordance with a mode to be operated, including an operation to: (a) output the image data from the first memory access controller to the common bus, (b) input the image data from the common bus to the image processing unit, (c) operate the image processing unit, (d) output the image data from the image processing unit to the common bus, and (e) output the image data from the common bus to the second memory access controller.

2. The apparatus according to claim 1, wherein the common bus includes a plurality of data channels,
the plurality of data channels can be divided and used as a first group of channels, which are one portion of the plurality of data channels, and a second group of channels, which are remaining portion of the plurality of data channels, and
the image processing unit includes a plurality of LUT modules each configured to perform conversion processing on the image data, and a quantization processing module, each of the plurality of LUT modules receives the image data from the common bus and outputs the image data which has undergone the conversion processing to the common bus, and the quantization processing module performs binarization processing on the image data which has undergone the conversion processing.

3. The apparatus according to claim 2, wherein each of the plurality of LUT modules includes:

a first selector configured to select one of data from the first group of channels and data from the second group of channels;

an LUT configured to perform conversion processing on the data selected by the first selector;

a second selector configured to select one of the data output from the LUT and the data from the first group of channels; and a third selector configured to select one of the data output from the LUT and the data from the second group of channels.

4. The apparatus according to claim 3, wherein the setting unit performs, in accordance with the mode to be operated, a selection operation in each of the first selector, the second selector, and the third selector.

5. The apparatus according to claim 2, wherein the image data written in the memory by the second memory access controller is output to a printer engine.

6. The apparatus according to claim 5, wherein the printer engine uses an inkjet printhead to discharge ink onto a print medium to print an image.

7. The apparatus according to claim 5, wherein the printer engine is incorporated in the image processing apparatus.

8. The apparatus according to claim 5, wherein the printer engine is provided outside of the image processing apparatus.

9. The apparatus according to claim 2, wherein in a case in which the image data is color image data, image data, which has been formed by a first number of components per pixel and has undergone the conversion processing by the plurality of LUT modules, is transferred by the first group of channels and the second group of channels during an operation by the first mode, and image data, which has been formed by a second number of components which is less than the first number of components per pixel and has undergone the conversion processing by the plurality of LUT modules, is transferred by two pixels at once as image data of one pixel by the first group of channels and image data of another pixel by the second group of channels.

10. The apparatus according to claim 2, wherein in a case in which the image data is monochrome image data, image data, which has been formed by one component per pixel and has undergone the conversion processing by the plurality of LUT modules, is transferred by using all of the plurality of data channels to concurrently transfer a number of pixels which is the same as a number of the plurality of data channels.

11. The apparatus according to claim 2, wherein in a case in which the image data is monochrome image data, image data, which has been formed by one component per pixel and has undergone the conversion processing by the plurality of LUT modules, is transferred by two pixels at once as image data of one pixel by the first group of channels and image data of another pixel by the second group of channels.

12. The apparatus according to claim 9, wherein the common bus includes eight data channels, the first group of channels includes four data channels, and the second group of channels includes four data channels.

13. The apparatus according to claim 12, wherein the image data read out from the memory by the first memory access controller is RGB data, the plurality of LUT modules convert the RGB data into CMYKcmyGy data for each pixel and output the CMYKcmyGy data to the eight data channels per color component during an operation by the first mode, the plurality of LUT modules convert the RGB data into CMYK data and output two pixels at once so that one pixel is output to the four data channels of the first group of channels and another pixel is output to the four data channels of the second group of channels, and C is data for printing by cyan (C) ink, c is data for printing by light cyan (c) ink, M is data for printing by magenta (M) ink, m is data for printing by light magenta (m) ink, Y is data for printing by yellow (Y) ink, y is data for printing by light yellow (y) ink, K is data for printing by black (K) ink, and Gy is data for printing by gray (Gy) ink.

14. The apparatus according to claim 13, wherein during the operation by the first mode, the image data written in the memory by the second memory access controller is the CMYKcmyGY data, and during the operation by the second mode, the image data written in the memory by the second memory access controller is the CMYK data.

15. The apparatus according to claim 2, wherein the conversion processing to be executed by each of the plurality of LUT modules includes brightness to density conversion, γ correction, and resolution conversion.

16. The apparatus according to claim 2, wherein the quantization processing module performs binarization processing by dither processing.

17. An image processing method of an image processing apparatus that operates in a plurality of modes including a first mode for performing high image quality processing of image data and a second mode for performing high-speed processing of image data, and includes a memory configured to store image data, a first memory access controller configured to read out the image data from the memory, an image processing unit configured to perform image processing on the image data read out by the first memory access controller, a second memory access controller configured to write, into the memory, the image data that has undergone the image processing by the image processing unit, and a common bus configured to connect the first memory access controller, the image processing unit, and the second memory access controller to transfer the image data, the method comprising:

performing setting of a setting for each of a plurality of operations performed by the image processing apparatus, in accordance with a mode to be operated, including operations to: (a) output the image data from the first memory access controller to the common bus, (b) input the image data from the common bus to the image processing unit, (c) operating the image processing unit, (d) output the image data from the image processing unit to the common bus, and (e) output the image data from the common bus to the second memory access controller.

* * * * *